(12) United States Patent
Kobayashi

(10) Patent No.: US 7,419,268 B2
(45) Date of Patent: Sep. 2, 2008

(54) IMAGE PROCESSING SYSTEM, PROJECTOR, AND IMAGE PROCESSING METHOD

(75) Inventor: Masanobu Kobayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/880,642

(22) Filed: Jul. 1, 2004

(65) Prior Publication Data
US 2005/0041216 A1 Feb. 24, 2005

(30) Foreign Application Priority Data
Jul. 2, 2003 (JP) ............................. 2003-270320
Mar. 18, 2004 (JP) ............................. 2004-078412

(51) Int. Cl.
*G03B 21/14* (2006.01)
*H04N 3/22* (2006.01)

(52) U.S. Cl. ........................................ 353/69; 348/745

(58) Field of Classification Search ................... 353/69, 353/70, 121; 348/745–747; 345/690, 697–699
See application file for complete search history.

(56) References Cited

U.S. PATENT DOCUMENTS

| | | | |
|---|---|---|---|
| 5,933,132 A | 8/1999 | Marshall et al. | |
| 6,753,907 B1 * | 6/2004 | Sukthankar et al. | 348/222.1 |
| 6,836,298 B2 | 12/2004 | Song et al. | |
| 6,846,081 B2 * | 1/2005 | Mochizuki et al. | 353/70 |
| 6,932,480 B2 * | 8/2005 | Wada et al. | 353/69 |
| 2002/0021418 A1 * | 2/2002 | Raskar | 353/69 |
| 2003/0210381 A1 * | 11/2003 | Itaki | 353/70 |
| 2004/0201825 A1 * | 10/2004 | Kobayashi et al. | 353/70 |
| 2004/0240748 A1 * | 12/2004 | Matsuda | 382/274 |
| 2004/0257540 A1 * | 12/2004 | Roy et al. | 353/69 |
| 2005/0024597 A1 * | 2/2005 | Kubo et al. | 353/69 |
| 2005/0105057 A1 * | 5/2005 | Matsuda et al. | 353/70 |
| 2005/0168705 A1 * | 8/2005 | Li et al. | 353/69 |
| 2005/0213846 A1 * | 9/2005 | Matsuda et al. | 382/275 |

FOREIGN PATENT DOCUMENTS

| | | |
|---|---|---|
| JP | A 2000-241874 | 8/2000 |
| JP | A 2001-169211 | 6/2001 |
| JP | 2002-62842 | 2/2002 |
| JP | A-2002-247614 | 8/2002 |
| JP | A-2004-040395 | 2/2004 |
| KR | A 2001-0062211 | 7/2001 |
| WO | WO 01/47259 A1 | 6/2001 |
| WO | WO 01/47285 A1 | 6/2001 |

* cited by examiner

OTHER PUBLICATIONS

Sukthankar et al., "Smarter Presentations: Exploiting Homography in Camera-Projector Systems", Proceedings of International Conference on Computer Vision, vol. 1, 2001, pp. 247-253.

*Primary Examiner*—Andrew T Sever
(74) *Attorney, Agent, or Firm*—Oliff & Berridge, PLC

(57) ABSTRACT

A projector includes a calibration image information generation section, an image projection section which projects a calibration image, a sensing section which senses a region including the projected calibration image and a projection target through a sensing plane to generate sensing information, a projection target region information generation section which generates projection target region information which indicates coordinates of four corners of the projection target in a sensing region based on the sensing information, a projection area information generation section which generates projection area information which indicates coordinates of four corners of the calibration image in the sensing region based on the sensing information, a correction information generation section which generates image distortion correction information based on the projection target region information and the projection area information, and a distortion correction section which corrects image distortion based on the image distortion correction information.

14 Claims, 19 Drawing Sheets

FIG. 11

| θy (DEGREE) | θx (DEGREE) | E | | F | | G | | H | |
|---|---|---|---|---|---|---|---|---|---|
| | | x | y | x | y | x | y | x | y |
| 0 | 0 | 0 | 0 | 0 | 767 | 1023 | 767 | 1023 | 0 |
| 5 | 0 | 16 | 12 | 16 | 755 | 1023 | 767 | 1023 | 0 |
| 10 | 0 | 32 | 24 | 32 | 743 | 1023 | 767 | 1023 | 0 |
| 15 | 0 | 48 | 36 | 48 | 731 | 1023 | 767 | 1023 | 0 |
| ⋮ | ⋮ | ⋮ | ⋮ | ⋮ | ⋮ | ⋮ | ⋮ | ⋮ | ⋮ |

FIG. 19

$$\begin{pmatrix} Ax & Ay & 1 & 0 & 0 & 0 & -Ix*Ax & -Ix*Ay \\ 0 & 0 & 0 & Ax & Ay & 1 & -Iy*Ax & -Iy*Ay \\ Bx & By & 1 & 0 & 0 & 0 & -Jx*Bx & -Jx*By \\ 0 & 0 & 0 & Bx & By & 1 & -Jy*Bx & -Jy*By \\ Cx & Cy & 1 & 0 & 0 & 0 & -Kx*Cx & -Kx*Cy \\ 0 & 0 & 0 & Cx & Cy & 1 & -Ky*Cx & -Ky*Cy \\ Dx & Dy & 1 & 0 & 0 & 0 & -Lx*Dx & -Lx*Dy \\ 0 & 0 & 0 & Dx & Dy & 1 & -Ly*Dx & -Ly*Dy \end{pmatrix} \begin{pmatrix} Pa \\ Pb \\ Pc \\ Pd \\ Pe \\ Pf \\ Pg \\ Ph \end{pmatrix} = \begin{pmatrix} Ix \\ Iy \\ Jx \\ Jy \\ Kx \\ Ky \\ Lx \\ Ly \end{pmatrix}$$

IMAGE PROCESSING SYSTEM, PROJECTOR, AND IMAGE PROCESSING METHOD

Japanese Patent Application No. 2003-270320, filed on Jul. 2, 2003, and Japanese Patent Application No. 2004-78412, filed on Mar. 18, 2004 are hereby incorporated by reference in their entirety.

BACKGROUND OF THE INVENTION

The present invention relates to an image processing system, a projector, a program, an information storage medium, and an image processing method capable of correcting image distortion.

An image may be distorted due to the relative angle formed by the optical axis of projection light from an image projection device such as a projector and a projection target such as a screen, whereby keystone distortion may occur in the vertical direction or horizontal direction.

Therefore, the image display device must display an image while eliminating distortion of the image.

A conventional projector with an image distortion correction function corrects image distortion only in the vertical direction using a built-in angle sensor, and cannot correct image distortion in the horizontal direction.

In the case of correcting image distortion in the horizontal direction, a user points at the four corners of the screen using a mouse or the like, and the projector semi-automatically corrects image distortion based on the point information. However, it is troublesome for the user to point at the four corners of the screen using a mouse or the like.

In order to solve such a problem, Japanese Patent Application Laid-open No. 2000-241874 has disclosed an automatic screen position adjustment device for a projector which detects the position of the screen in an image sensed by using a monitor camera based on an image signal input from the monitor camera, and adjusts keystone distortion of the projected image based on the detected screen position data.

In the method disclosed in Japanese Patent Application Laid-open No. 2000-241874, keystone distortion is adjusted by comparing the lengths of opposite sides of the screen in the sensed monitor screen as described in the specification of Japanese Patent Application Laid-open No. 2000-241874.

However, in the case where the height/width ratio (aspect ratio) of the projection target such as the screen is unknown, the projector cannot appropriately determine image distortion merely by comparing the lengths of opposite sides of the screen.

Japanese Patent application Laid-open No. 2002-247614 has disclosed a projector which detects the external shape of a screen by using a sensing section, and corrects an image so that the image has an external shape the same as the detected external shape.

However, if the projector changes the shape of the image into the external shape of the screen as disclosed in Japanese Patent application Laid-open No. 2002-247614, the image after changing has an external shape differing from the external shape of the original image. In this case, since an observer is given an impression differing from the original image, it is not preferable to employ such a processing method.

Moreover, it is preferable that a projected image be displayed at a desired height/width ratio even if the height/width ratio of the projection target is used as a reference.

BRIEF SUMMARY OF THE INVENTION

The present invention has been achieved in view of the above-described problems, and may provide an image processing system, a projector, a program, an information storage medium, and an image processing method capable of correcting distortion of a projected image by determining the height/width ratio of the projection target and image distortion.

To solve the above-described problems, each of an image processing system and projector according to aspects of the present invention includes:

an image projection means for projecting a single-color calibration image formed of an arbitrary single color onto a projection target, and projecting a multi-color calibration image onto the projection target, the multi-color calibration image including a first region and a second region, the first region being in a first single color and smaller than an entire image region and the second region being a region other than the first region and in a second single color, which is a color other than the first single color;

a sensing means for sensing the single-color calibration image projected onto the projection target to generate first sensing information, and sensing the multi-color calibration image projected onto the projection target to generate second sensing information;

a projection target region information generation means for generating projection target region information which indicates coordinates of four corners of the projection target in a sensing region of the sensing means based on a difference in image signal value between each pixel based on the first sensing information;

a projection area information generation means for detecting the first region in the sensing region as a partial projection area based on a difference between the first sensing information and the second sensing information, and generating projection area information which indicates coordinates of four corners of a projection area in the sensing region based on the partial projection area;

a correction information generation means for generating image distortion correction information based on the projection target region information and the projection area information; and a distortion correction means for correcting an image signal so that image distortion is corrected based on the image distortion correction information, wherein the image projection means projects an image based on the image signal corrected by the distortion correction means.

A computer-readable program according to another aspect of the present invention causes a computer to function as:

an image projection means for projecting a single-color calibration image formed of an arbitrary single color onto a projection target, and projecting a multi-color calibration image onto the projection target, the multi-color calibration image including a first region and a second region, the first region being in a first single color and smaller than an entire image region and the second region being a region other than the first region and in a second single color, which is a color other than the first single color;

a sensing means for sensing the single-color calibration image projected onto the projection target to generate first sensing information, and sensing the multi-color calibration image projected onto the projection target to generate second sensing information;

a projection target region information generation means for generating projection target region information which indicates coordinates of four corners of the projection target in a sensing region of the sensing means based on a difference in image signal value between each pixel based on the first sensing information;

a projection area information generation means for detecting the first region in the sensing region as a partial projection area based on a difference between the first sensing information and the second sensing information, and generating projection area information which indicates coordinates of four corners of a projection area in the sensing region based on the partial projection area;

a correction information generation means for generating image distortion correction information based on the projection target region information and the projection area information; and a distortion correction means for correcting an image signal so that image distortion is corrected based on the image distortion correction information, wherein the image projection means projects an image based on the image signal corrected by the distortion correction means.

A further aspect of the present invention relates to an information storage medium storing a computer-readable program which stores the above program.

An image processing method according to a still further aspect of the present invention includes:

projecting a single-color calibration image formed of an arbitrary single color onto a projection target by an image projection section;

sensing the single-color calibration image projected onto the projection target by a sensing section to generate first sensing information;

projecting a multi-color calibration image onto the projection target, the multi-color calibration image including a first region and a second region, the first region being in a first single color and smaller than an entire image region and the second region being a region other than the first region and in a second single color, which is a color other than the first single color;

sensing the multi-color calibration image projected onto the projection target to generate second sensing information;

generating projection target region information which indicates coordinates of four corners of the projection target in a sensing region of the sensing section based on a difference in image signal value between each pixel based on the first sensing information;

detecting the first region in the sensing region as a partial projection area based on a difference between the first sensing information and the second sensing information, and generating projection area information which indicates coordinates of four corners of a projection area in the sensing region based on the partial projection area;

generating image distortion correction information based on the projection target region information and the projection area information;

correcting an image signal so that image distortion is corrected based on the image distortion correction information; and projecting an image based on the image signal.

According to the present invention, the image processing system and the like can determine the external shape of the projection target (screen, for example) based on the difference in image signal value (luminance value, for example) based on the sensing information.

Moreover, according to the present invention, even if the calibration image is projected at a size larger than the projection target, the image processing system and the like can form the region in the first single color (white or gray close to white, for example) which is reduced in size while maintaining the shape of the original image on the projection target by using the multi-color calibration image.

The image processing system and the like can determine image distortion by sensing the single-color region in the first single color formed on the projection target.

The image processing system and the like can generate the image distortion correction information which indicates the degree of image adjustment required based on the difference between the projection position of the image after distortion correction and the projection position of the image before distortion correction, whereby image distortion can be appropriately corrected.

With these image processing system, projector, program and information storage medium, the first region may be formed by reducing the entire image region by 1/n, and the projection area information generation means may detect a region formed by multiplying the partial projection area by n as the projection area.

With this image processing method, the first region may be formed by reducing the entire image region by 1/n, and a region formed by multiplying the partial projection area by n may be detected as the projection area.

According to this feature, the image processing system and the like can detect the projection area more efficiently.

With these image processing system, projector, program and information storage medium, the correction information generation means may:

calculate a relative distance between an origin in a three-dimensional space in which an optical axis of the sensing means is added to a two-dimensional plane of the sensing region as a third dimension and the four corners of the projection target on the optical axis based on the projection target region information;

calculate coordinates of the four corners of the projection target in the three-dimensional space based on the projection target region information and the relative distance;

calculate a first height/width ratio which indicates a height/width ratio of the projection target by calculating lengths of two sides of the projection target which are not opposite each other based on the coordinates;

calculate coordinates of four corners of an image in the sensing region in a case where the image projection means projects the image onto the projection target in an undistorted state at a second height/width ratio based on the first height/width ratio, the second height/width ratio and the projection target region information, the second height/width ratio indicating a height/width ratio of the single-color calibration image, the multi-color calibration image, or a projection panel of the image projection means; and generate the image distortion correction information based on the coordinates of the four corners of the image in the sensing region and the projection area information.

This image processing method may include:

calculating a relative distance between an origin in a three-dimensional space in which an optical axis of the sensing section is added to a two-dimensional plane of the sensing region as a third dimension and the four corners of the projection target on the optical axis based on the projection target region information;

calculating coordinates of the four corners of the projection target in the three-dimensional space based on the projection target region information and the relative distance;

calculating a first height/width ratio which indicates a height/width ratio of the projection target by calculating lengths of two sides of the projection target which are not opposite each other based on the coordinates;

calculating coordinates of four corners of an image in the sensing region in a case of projecting the image onto the projection target in an undistorted state at a second height/width ratio based on the first height/width ratio, the second height/width ratio and the projection target region information, the second height/width ratio indicating a height/width ratio of the single-color calibration image, the multi-color calibration image, or a projection panel of the image projection section; and generating the image distortion correction information based on the coordinates of the four corners of the image in the sensing region and the projection area information.

An image processing system and a projector according to still further aspects of the present invention includes:

an image projection means for projecting a calibration image onto a projection target;

a sensing means for sensing the calibration image to generate sensing information;

a projection target region information generation means for generating projection target region information which indicates coordinates of four corners of the projection target in a sensing region of the sensing means based on the sensing information;

a projection area information generation means for generating projection area information which indicates coordinates of four corners of a projection area in the sensing region based on the sensing information;

a correction information generation means for generating image distortion correction information based on the projection target region information and the projection area information; and a distortion correction means for correcting an image signal based on the image distortion correction information so that image distortion is corrected, wherein the image projection means projects an image based on the image signal that has been corrected by the distortion correction means, and wherein the correction information generation means determines a first height/width ratio which indicates a height/width ratio of the projection target based on the projection target region information, and generates projection coordinate system projection area information which indicates coordinates of four corners of the projection area in a projection panel of the image projection means based on the projection area information and generates the image distortion correction information based on the projection coordinate system projection area information so that an image is displayed at a second height/width ratio which indicates a desired height/width ratio corresponding to the first height/width ratio.

A computer-readable program according to an even further aspect of the present invention causes a computer to function as:

an image projection means for projecting a calibration image onto a projection target;

a sensing means for sensing the calibration image to generate sensing information;

a projection target region information generation means for generating projection target region information which indicates coordinates of four corners of the projection target in a sensing region of the sensing means based on the sensing information;

a projection area information generation means for generating projection area information which indicates coordinates of four corners of a projection area in the sensing region based on the sensing information;

a correction information generation means for generating image distortion correction information so that an image is projected onto the projection target region at a desired height/width ratio, based on the projection target region information and the projection area information; and a distortion correction means for correcting an image signal based on the image distortion correction information so that image distortion is corrected, wherein the image projection means projects an image based on the image signal that has been corrected by the distortion correction means, and wherein the correction information generation means determines a first height/width ratio which indicates a height/width ratio of the projection target based on the projection target region information, and generates projection coordinate system projection area information which indicates coordinates of four corners of the projection area in a projection panel of the image projection means based on the projection area information and generates the image distortion correction information based on the projection coordinate system projection area information so that an image is displayed at a second height/width ratio which indicates a desired height/width ratio corresponding to the first height/width ratio.

A yet further aspect of the present invention relates to an information storage medium storing a computer-readable program which stores the above program.

An image processing method according to an even more aspect of the present invention includes:

projecting a calibration image onto a projection target by an image projection section;

sensing the calibration image by a sensing section to generate sensing information;

generating projection target region information which indicates coordinates of four corners of the projection target in a sensing region of the sensing section based on the sensing information;

generating projection area information which indicates coordinates of four corners of a projection area in the sensing region based on the sensing information;

generating projection coordinate system projection area information which indicates coordinates of four corners of the projection area in a projection panel of the image projection section based on the projection area information;

determining a first height/width ratio which indicates a height/width ratio of the projection target based on the projection coordinate system projection area information;

generating image distortion correction information so that an image is projected at a second height/width ratio which indicates a desired height/width ratio corresponding to the first height/width ratio;

correcting an image signal based on the image distortion correction information so that image distortion is corrected; and projecting an image based on the corrected image signal.

According to the present invention, the image processing system and the like can display an image at an original height/width ratio by generating the image distortion correction information so that the image is projected at the original height/width ratio instead of changing the shape of the image corresponding to the shape of the projection target.

With any of these image processing systems, projectors, programs and information storage mediums, the correction information generation means may determine a first height/width ratio which indicates a height/width ratio of the projection target based on the projection target region information, and may generate projection coordinate system projection area information which indicates coordinates of four corners of the projection area in a projection panel of the image projection means based on the projection area information and may generate the image distortion correction information based on the projection coordinate system projection area information so that an image is displayed at a second height/width ratio which indicates a desired height/width ratio corresponding to the first height/width ratio.

Any of these image processing methods may include:

determining a first height/width ratio which indicates a height/width ratio of the projection target based on the projection target region information;

generating projection coordinate system projection area information which indicates coordinates of four corners of the projection area in a projection panel based on the projection area information so that an image is displayed at a second height/width ratio which indicates a desired height/width ratio corresponding to the first height/width ratio; and generating the image distortion correction information based on the projection coordinate system projection area information.

According to this feature, the image processing system and the like can display an image at a desired height/width ratio irrespective of the shape of the projection target by generating the image distortion correction information so that the image is displayed at a desired height/width ratio instead of changing the shape of the image corresponding to the shape of the projection target.

With any of these image processing systems, projectors, programs and information storage mediums, the correction information generation means may:

calculate a relative distance between an origin in a three-dimensional space in which an optical axis of the sensing means is added to a two-dimensional plane of the sensing region as a third dimension and the four corners of the projection target on the optical axis based on the projection target region information;

calculate coordinates of the four corners of the projection target in the three-dimensional space based on the projection target region information and the relative distance; and calculate a first height/width ratio by calculating lengths of two sides of the projection target which are not opposite each other based on the coordinates.

Any of these image processing methods may include:

calculating a relative distance between an origin in a three-dimensional space in which an optical axis of the sensing section is added to a two-dimensional plane of the sensing region as a third dimension and the four corners of the projection target on the optical axis based on the projection target region information;

calculating coordinates of the four corners of the projection target in the three-dimensional space based on the projection target region information and the relative distance; and calculating a first height/width ratio by calculating lengths of two sides of the projection target which are not opposite each other based on the coordinates.

According to this feature, the image processing system and the like can increase the degrees of freedom on installation of the sensing means by executing image processing in the three-dimensional space based on the sensing means.

With any of these image processing systems, projectors, programs and information storage mediums, the projection target region information generation means may search for an image signal value of the sensing information so that each pixel is radially searched for from a region near a center of the sensing region, and may generate the projection target region information by determining the projection target region based on a difference in the image signal value during searching.

Any of these image processing methods may include searching for an image signal value of the sensing information so that each pixel is radially searched for from a region near a center of the sensing region, and generating the projection target region information by determining the projection target region based on a difference in the image signal value during searching when generating the projection target region information.

According to this feature, the image processing system and the like are rarely affected by noise by searching for the image signal value of the sensing information so that each pixel is radially searched for from a region near the center of the sensing information, whereby the projection target region can be detected more accurately.

BRIEF DESCRIPTION OF THE SEVERAL VIEWS OF THE DRAWING

FIG. 11 is a two-dimensional look-up table showing coordinates of four corners of a projection area after correction according to an example of an embodiment of the present invention.

FIG. 19 shows an arithmetic expression for determining coordinate transformation parameters according to an example of an embodiment of the present invention.

DETAILED DESCRIPTION OF THE EMBODIMENT

The present invention is described below with reference to the drawings taking the case of applying the present invention to a projector which corrects image distortion as an example. Note that the embodiments described below do not in any way limit the scope of the invention defined by the claims laid out herein. Note also that all the elements of the embodiments described below should not be taken as essential requirements for the invention defined by the claims laid out herein.

First Embodiment

Figure 1:
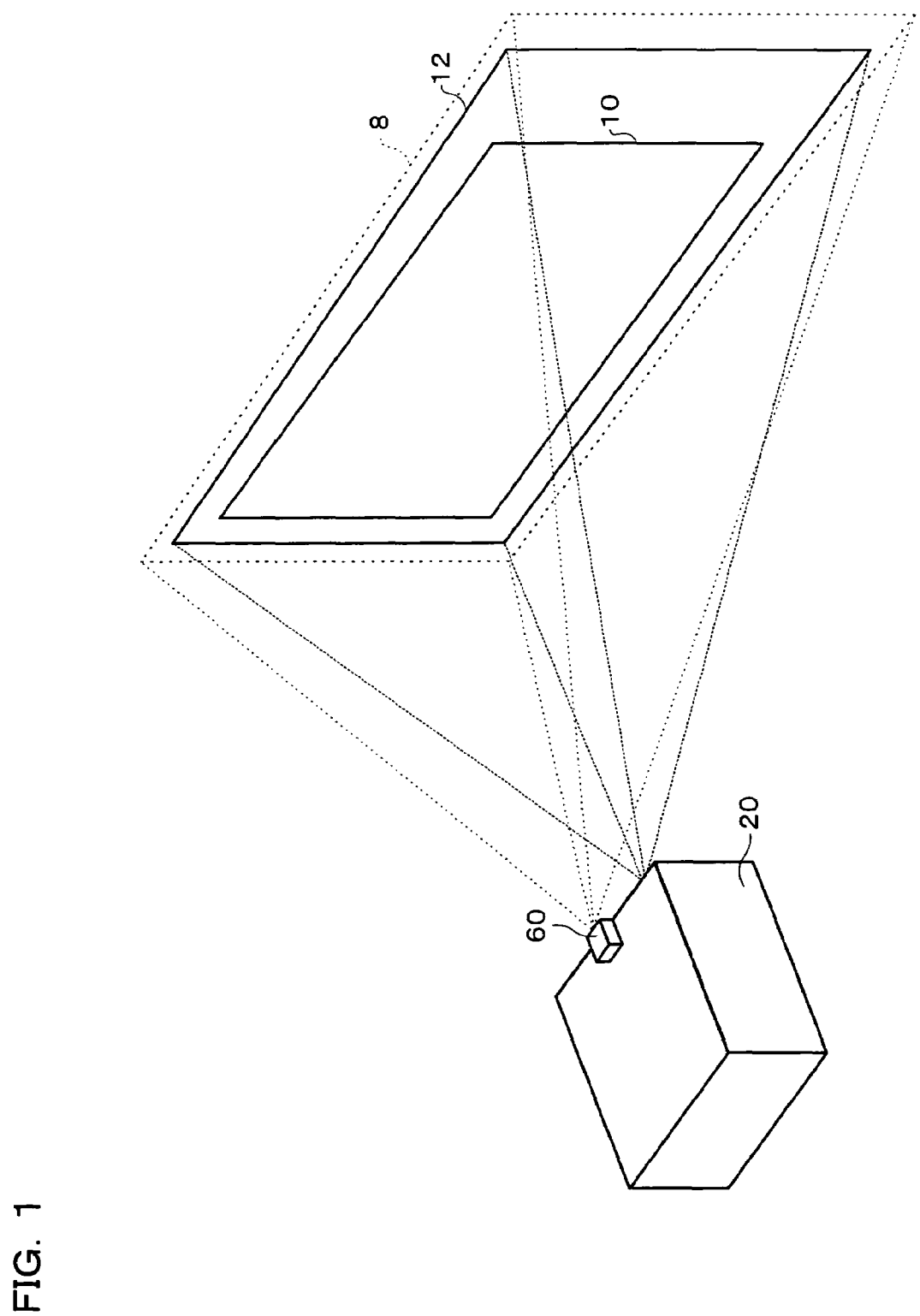
FIG. 1 is a schematic diagram showing a state during image projection.

FIG. 1 is a schematic diagram showing a state during image projection.

A projector 20 which is one type of an image processing system projects an image onto a screen 10 which is one type of a projection target. In the present embodiment, the projector 20 is not perpendicular to the screen 10. A projected image 12 formed by projection light from the projector 20 is larger than the screen 10. In the present embodiment, a wall exists behind the screen 10 and reflects the projection light to allow the projected image 12 to be displayed.

In the present embodiment, a sensor 60 which is a part of a sensing means senses a region including the projected image 12.

In the present embodiment, the projector 20 calculates the aspect ratio (height/width ratio) of the screen 10 based on sensing information from the sensor 60. The projector 20 corrects image distortion based on the calculated aspect ratio and a known aspect ratio of the projected image so that the projected image 12 is displayed within the screen 10 and has an aspect ratio equal to that of the projected image.

Functional blocks of the projector 20 for implementing the above-described function is described below.

Figure 2:
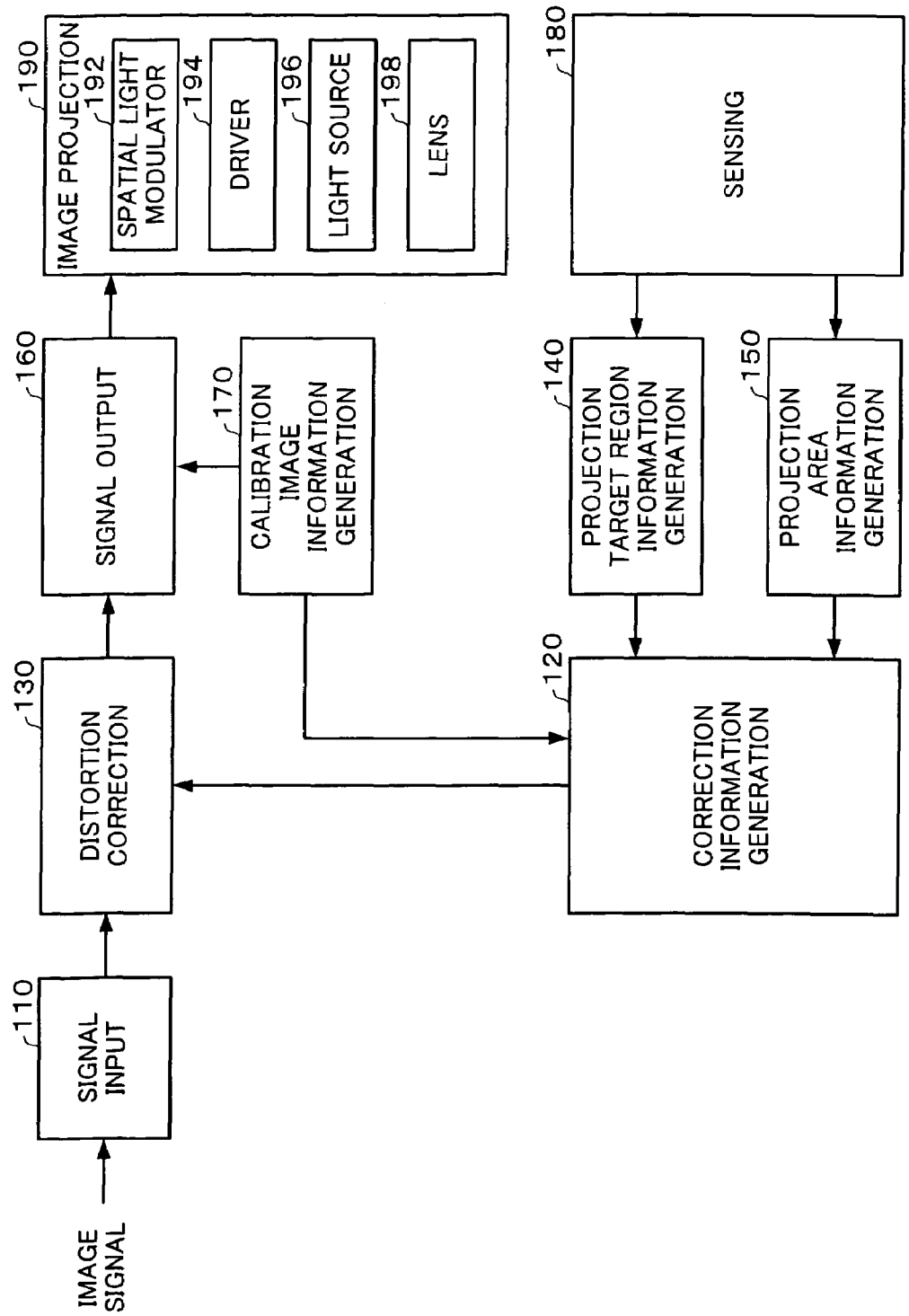
FIG. 2 is a functional block diagram of a projector according to an example of an embodiment of the present invention.

FIG. 2 is a functional block diagram of the projector 20 according to an example of the present embodiment.

The projector 20 includes a signal input section 110 to which an image signal is input, a distortion correction section 130 which corrects the input image signal so that image distortion is corrected, a signal output section 160 which outputs the corrected image signal, an image projection section 190 which is one type of an image projection means that projects an image based on the image signal, and a calibration image information generation section 170 which generates calibration image information.

The projector 20 includes a sensing section 180 which generates sensing information by sensing a region 8 including the projected image 12 through a sensing plane, a projection target region information generation section 140 which is one type of projection target region information generation means that detects the region of the screen 10 in the sensing region of the sensor 60 based on the sensing information, a projection area information generation section 150 which detects the region of the projected image 12 in the sensing region of the sensor 60, and a correction information generation section 120 which generates distortion correction information. The sensing section 180 includes the sensor 60.

The image projection section 190 includes a spatial light modulator 192, a driver section 194 which drives the spatial light modulator 192, a light source 196, and a lens 198.

The driver section 194 drives the spatial light modulator 192 based on the image signal from the signal output section 160. The image projection section 190 projects light from the light source 196 through the spatial light modulator 192 and the lens 198.

As hardware for implementing each section of the projector 20, the following hardware may be applied, for example.

Figure 3:
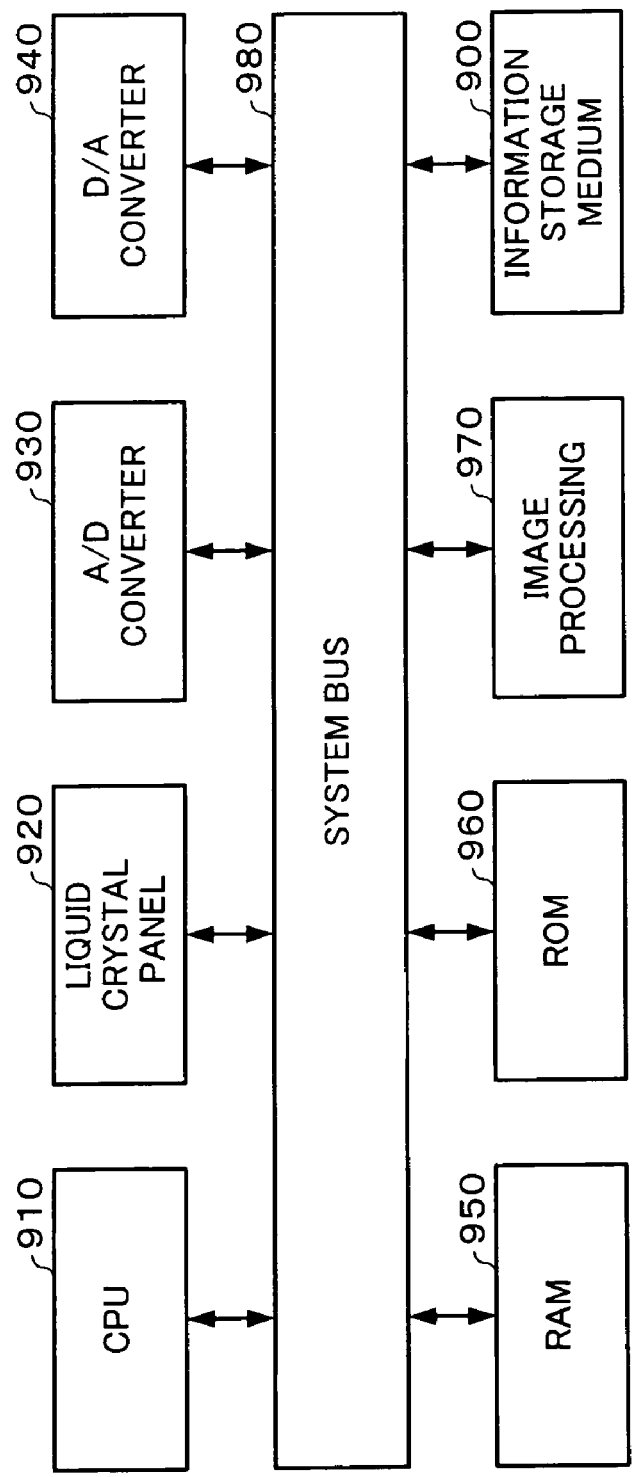
FIG. 3 is a hardware block diagram of a projector according to an example of an embodiment of the present invention.

FIG. 3 is a hardware block diagram of the projector 20 according to an example of the present embodiment.

For example, each section of the projector 20 may be implemented by using an A/D converter 930 or the like as the signal input section 110, an image processing circuit 970, RAM 950, CPU 910, or the like as the distortion correction section 130, a D/A converter 940 or the like as the signal output section 160, the image processing circuit 970, RAM 950, or the like as the correction information generation section 120, projection target region information generation section 140, projection area information generation section 150, and calibration image information generation section 170, a CCD sensor, CMOS sensor, RGB sensor, or the like as the sensing section 180, and a liquid crystal panel 920, ROM 960 which stores a liquid crystal light valve driver which drives the liquid crystal panel 920, or the like as the spatial light modulator 192.

These sections can exchange information through a system bus 980.

Some or the entirety of these sections may be implemented by hardware such as a circuit or may be implemented by software such as a driver.

The function of the projection target region information generation section 140 and the like may be implemented by a computer by reading a program from an information storage medium 900 which stores a program for allowing the computer to operate as the projection target region information generation section 140 and the like.

As the information storage medium 900, a CD-ROM, DVD-ROM, ROM, RAM, HDD, or the like may be applied. The program reading method may be either a contact method or a noncontact method.

The above-described function may be implemented by downloading a program or the like for implementing each function from a host device or the like through a transmission line instead of reading from the information storage medium 900.

Description of Image Processing Flow

An image processing flow using these sections is described below.

Figure 4:
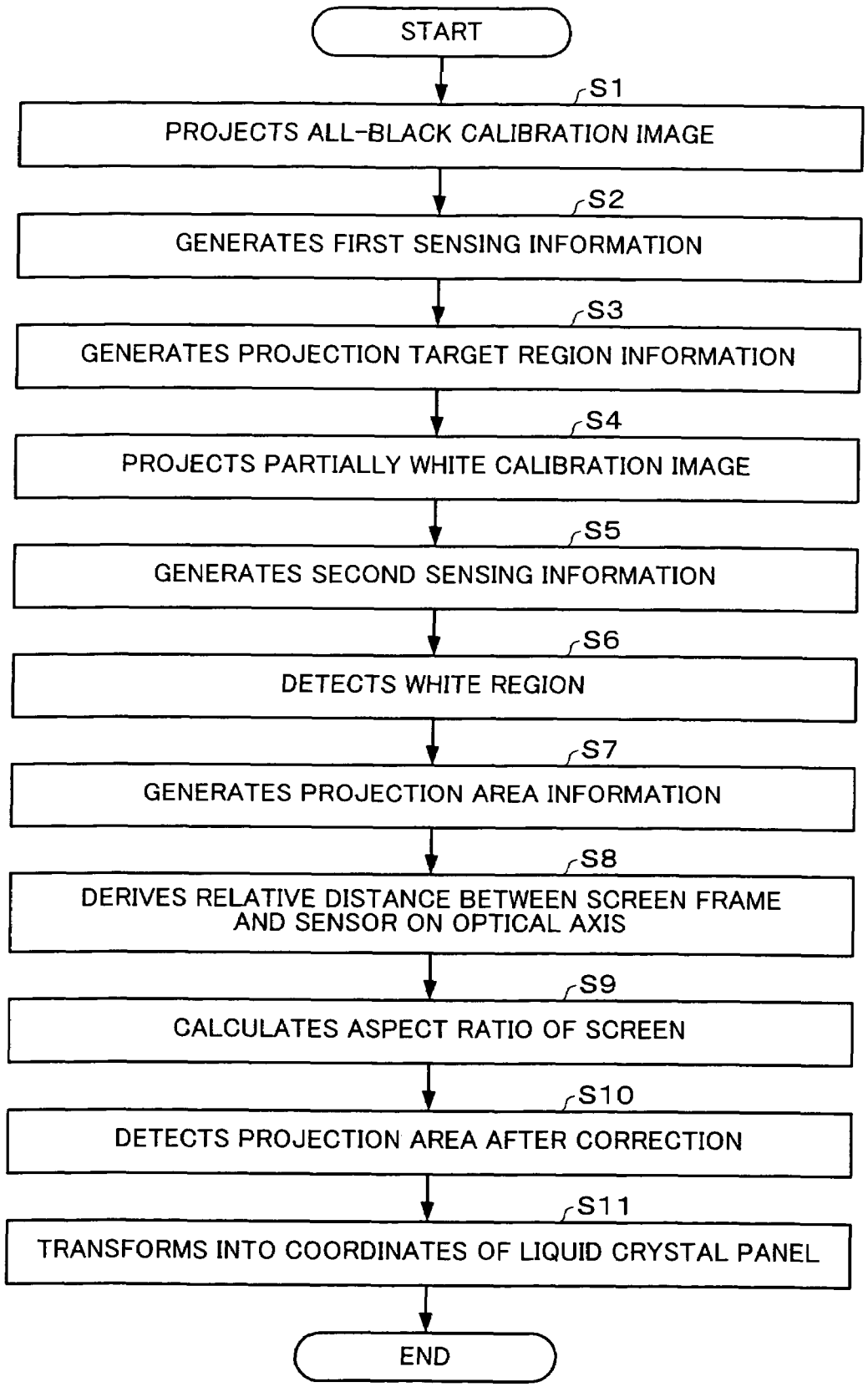
FIG. 4 is a flowchart showing a flow of image processing according to an example of an embodiment of the present invention.

FIG. 4 is a flowchart showing a flow of image processing according to an example of the present embodiment.

The calibration image information generation section 170 generates image information for an all-black single-color calibration image (entire image is black), and the signal output section 160 outputs a digital signal of the image information to the image projection section 190.

The image projection section 190 projects an all-black calibration image onto the screen 10 based on the digital signal (step S1). This allows an all-black calibration image to be displayed on the screen 10.

The sensing section 180 senses the region including the projected image 12 through the sensing plane to generate first sensing information (step S2). The sensing information refers to information which indicates a luminance value or an image signal value which can generate the luminance value, such as an XYZ value, for each pixel of the sensor 60, for example. The XYZ value is an international standard defined by International Commission on Illumination (CIE) and is one type of an image signal value for a device independent color.

Figure 5:
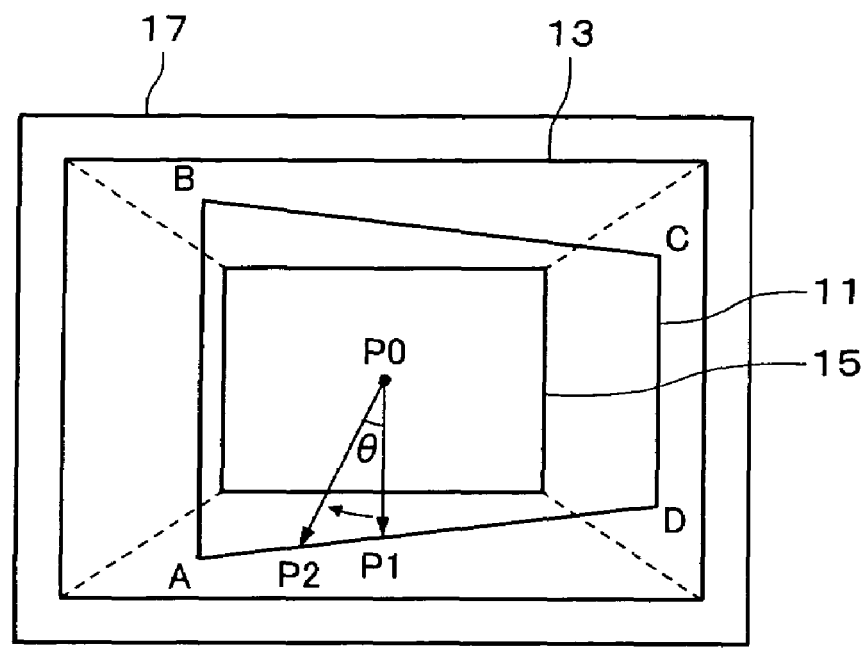
FIG. 5 is a schematic diagram showing a sensing region according to an example of an embodiment of the present invention.

FIG. 5 is a schematic diagram showing a sensing region 17 according to an example of the present embodiment.

The sensing region 17 is a region corresponding to the sensing plane at which the sensor 60 senses an image, and is a region schematically showing the sensing information of the sensor 60 in the shape of a quadrilateral. In more detail, a region of the sensing plane of a CCD sensor or the like applies to the sensing region 17, for example.

In the present embodiment, the optical axis of the sensor 60 and the optical axis of the lens 198 face in the same direction, and the projector 20 is not perpendicular to the screen 10. Therefore, when viewed from the sensor 60, the projection area 13 which is the region of the projected image 12 is seen in the shape of a quadrilateral in the same manner as the sensing region 17, and the projection target region 11 which is the region of the screen 10 is distorted, as shown in FIG. 5.

In the present embodiment, the projection target region information generation section 140 searches for the luminance value radially outward from the intersecting point P0 of the diagonals of the projection area 13, that is, the center P0 of the projection area 13 (which may not necessarily be the center, but may be near the center). The projection target region information generation section 140 detects a line segment P0P1 on which approximately the same luminance value continues from the center P0 as a part of the projection target region 11. The projection target region information generation section 140 performs the same processing at a position at an angle of θ to detect a line segment P0P2 as a part of the projection target region 11. The distance of the line segment is denoted by L.

Figure 6:
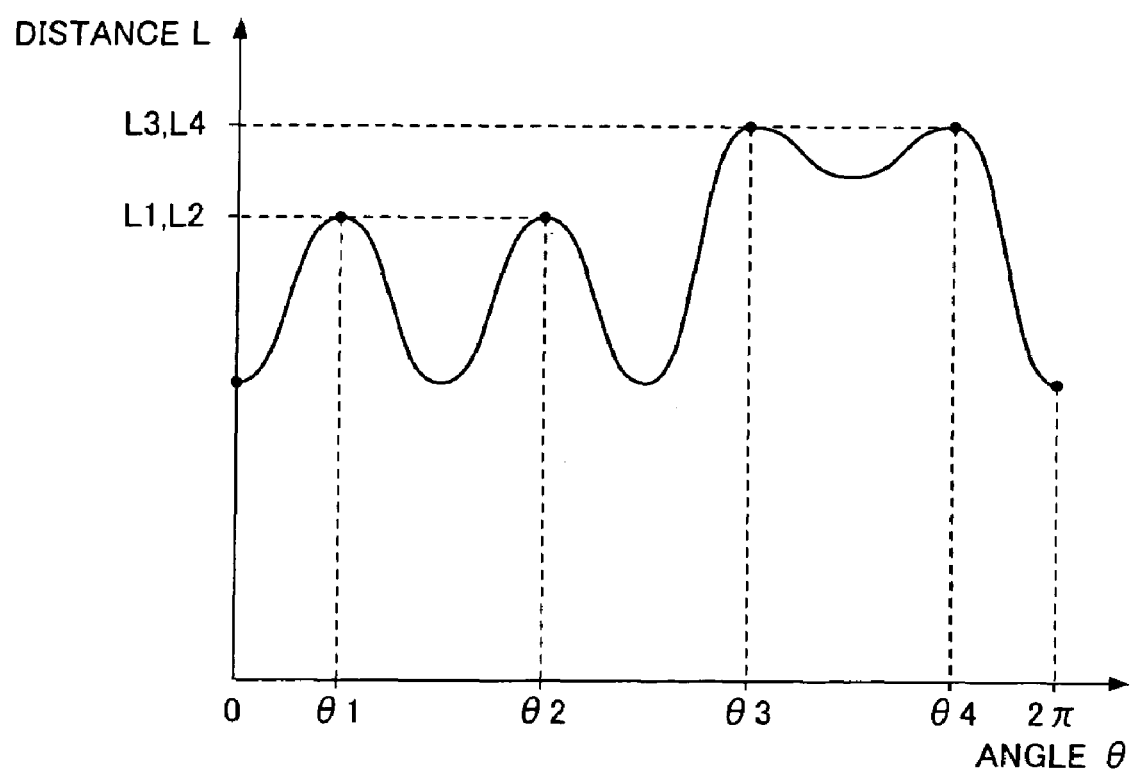
FIG. 6 is a schematic diagram showing the relationship between an angle θ and a distance L.

FIG. 6 is a schematic diagram showing the relationship between the angle 74 and the distance L.

The distance L changes as shown in FIG. 6 as the angle θ (θ is 0-2π) changes, and forms four peaks at angles θ1, θ2, θ3, and θ4, for example.

The projection target region information generation section 140 calculates the sensor coordinates of four corners A, B, C, and D of the projection target region 11 from the sensor coordinates of the center P0 of the sensing region 17 (coordinates in the sensing region 17) and the distances L1, L2, L3, and L4 at the angles θ1, θ2, θ3, and θ4.

The projection target region information generation section 140 generates projection target region information which shows the sensor coordinates of the four corners (step S3), and sends the projection target region information to the correction information generation section 120.

The calibration image information generation section 170 generates calibration information for a multi-color calibration image which includes a white image (which may not necessarily be white, but may be a single color such as gray close to white) formed by reducing the original image by an arbitrary factor such as ¼ at the center and in which the region outside the white image consists of a black image (which may not necessarily be black, but may be a single color such as gray close to black). The image projection section 190 projects the multi-color calibration image (step S4).

The sensing section 180 senses the region 8 including the projected image 12 of the multi-color calibration image projected onto the screen 10 to generate second sensing information (step S5).

As shown in FIG. 5, a white region 15 corresponding to the white image is formed inside the projection target region 11 by the second sensing information.

The projection area information generation section 150 compares the luminance value of each pixel in the white region 15 with the luminance value of each pixel in the projection target region 11 to detect the white region 15 at a constant luminance ratio (step S6).

The projection area information generation section 150 calculates the sensor coordinates of the projection area 13 by increasing the sensor coordinates of the four corners of the white region 15 by n which is the inverse of the reduction factor.

The projection area information generation section 150 generates the projection area information which indicates the sensor coordinates of the projection area 13 (step S7), and sends the projection area information to the correction information generation section 120.

The correction information generation section 120 derives the relative distance between the screen 10 and the sensor 60 on the optical axis of the sensor 60 (step S8).

In more detail, in the case where the sensor coordinates of the projection target region 11 are denoted by A(Ax, Ay), B(Bx, By), C(Cx, Cy), and D(Dx, Dy), in the XYZ three-dimensional space in which the optical axis of the sensor 60 is added to the two-dimensional plane XY of the sensing region 17 of the sensor 60 as a third dimension Z, the coordinates of the four corners of the screen 10 are denoted by A'(s*Ax, s*Ay, s*Pz), B'(t*Bx, t*By, t*Pz), C'(u*Cx, u*Cy, u*Pz), and D'(v*Dx, v*Dy, v*Pz). Pz is the distance on the Z axis from the origin of the sensor coordinate system to the virtual sensing plane as the sensing region 17. The projection target region information generation section 140 determines Pz by calculating Pz=(VR/2)/tan(θc/2) based on the relationship between the horizontal view angle θc and the horizontal resolution VR of the sensor 60.

Figure 7:
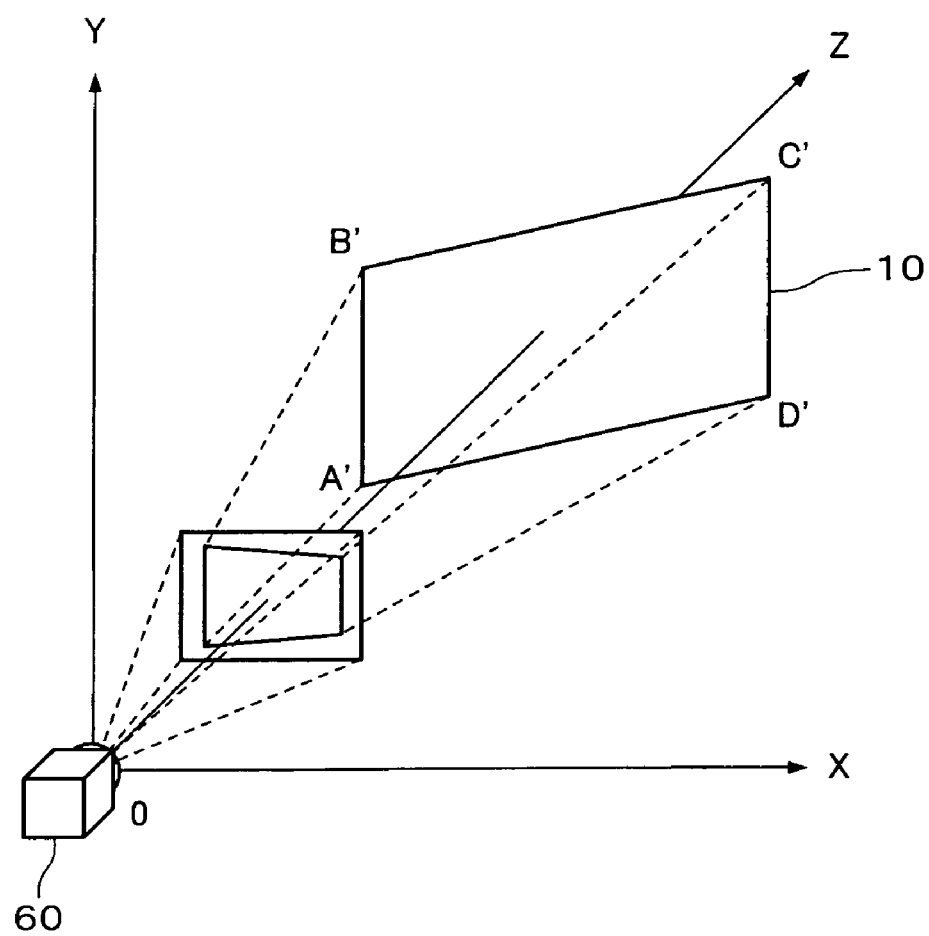
FIG. 7 is a schematic diagram of an XYZ three-dimensional space according to an example of an embodiment of the present invention.

FIG. 7 is a schematic diagram of the XYZ three-dimensional space according to an example of the present embodiment.

Since the screen 10 is known to be rectangular (may be square), the line segment A'B' equals the line segment D'C'. t, u, and v are expressed as follows on the assumption that this condition is satisfied.

$$t=s*\{(Dy-Cy)*(Ax-Dx)-(Dx-Cx)*(Ay-Dy)\}/\{(Dy-Cy)*(Bx-Dx)-(Dx-Cx)*(By-Dy)\}$$

$$u=s*\{(By-Dy)*(Ax-Dx)-(Bx-Dx)*(Ay-Dy)\}/\{(By-Dy)*(Dx-Cx)-(Bx-Dx)*(Dy-Cy)\}$$

$$v=s-t+u$$

The relative distances on the optical axis (Z-axis component) from the origin to the four corners A, B, C, and D of the screen 10 can be obtained by assuming that s is 1 (may not necessarily be 1).

The correction information generation section 120 calculates the aspect ratio of the screen 10 by comparing |A'B'| and |B'C'| which show the lengths of two sides of the screen 10 which are not opposite each other.

The correction information generation section 120 derives the projection area after correction (step S10).

Figure 8:
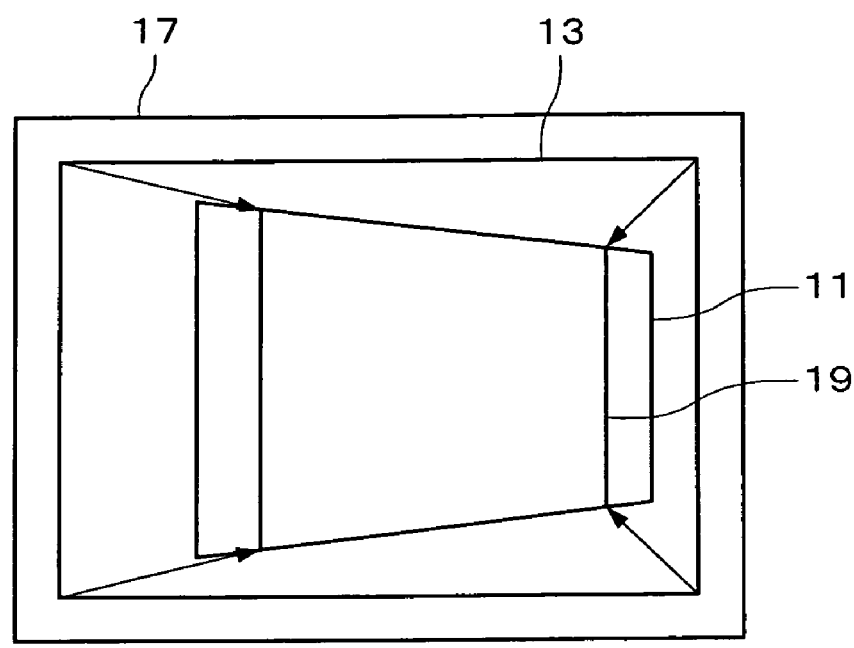
FIG. 8 is a schematic diagram of a projection area after correction according to an example of an embodiment of the present invention.

FIG. 8 is a schematic diagram of a projection area 19 after correction according to an example of the present embodiment.

In the case where the aspect ratio of the projected image 12 is 4:3 and the aspect ratio of the screen 10 is 4:2, a region which is reduced by ⅙ from the right and left ends of the projection target region 11 in the sensing region 17 is the projection area 19 after correction. The aspect ratio of the projected image 12 is generally known such as 4:3 or 16:9.

The correction information generation section 120 transforms the coordinates of the projection area 19 after correction in the sensing region 17 into the image processing coordinates of the spatial light modulator 192 (step S11).

The correction information generation section 120 calculates the difference between the image processing coordinates of the spatial light modulator 192 after distortion correction and the image processing coordinates of the spatial light modulator 192 before distortion correction, and generates the difference as image distortion correction information.

The distortion correction section 130 corrects the image signal based on the image distortion correction information so that image distortion is corrected.

This enables the image projection section 190 to project an image after distortion correction.

As described above, according to the present embodiment, the external shape of the projection target (screen 10, for example) can be determined based on the difference in the image signal value (luminance value, for example) based on the sensing information.

According to the present embodiment, even if the calibration image 12 is projected at a size larger than the screen 10, the projector 20 can form a single-color region (white or gray close to white, for example) which is reduced in size while maintaining the shape of the original image on the screen 10 by using the multi-color calibration image.

The projector 20 can determine image distortion by sensing the single-color region formed on the projection target.

The image processing system or the like can determine the projection position of the image after distortion correction based on the height/width ratio of the projection target determined by sensing and the height/width ratio of the calibration image. The image processing system or the like can generate the image distortion correction information which indicates the degree of image adjustment required based on the difference between the projection position of the image after distortion correction and the projection position of the image before distortion correction, whereby distortion of the image can be appropriately corrected.

According to the present embodiment, the projector 20 can project an image at an original height/width ratio by generating the image distortion correction information so that the image is projected at the original height/width ratio instead of changing the shape of the image corresponding to the shape of the screen 10.

Therefore, according to the present embodiment, the projector 20 can automatically correct distortion of the projected image in the vertical direction and the horizontal direction which occurs during use of the projector 20 at an accurate aspect ratio. In particular, the projector 20 can correct image distortion without being restricted by the vertical and horizontal distortion detection angles of the image by correcting distortion utilizing the frame of the screen 10.

Since the linear component of the projection area after correction is in parallel to the frame of the screen 10, the projector 20 can display a visually recognizable image on the screen 10, even if the projector 20 is not installed perpendicular to the plane.

Since the projector 20 is rarely affected by an obstacle on the screen 10 by comparing the luminance value outward from the center when detecting the projection target region 11, the projector 20 can detect the projection target region 11 more accurately.

Modification of First Embodiment

The application of the present invention is not limited to the above-described embodiment.

In the above-described embodiment, the projector 20 uses the two-dimensional coordinates of the sensing region 17 of the sensor 60 and performs the processing on the assumption that the variable s is 1. However, the projector 20 may use the three-dimensional coordinates of the sensor 60 and set the variable s to a value conforming to the actual sensor 60.

Figure 9:
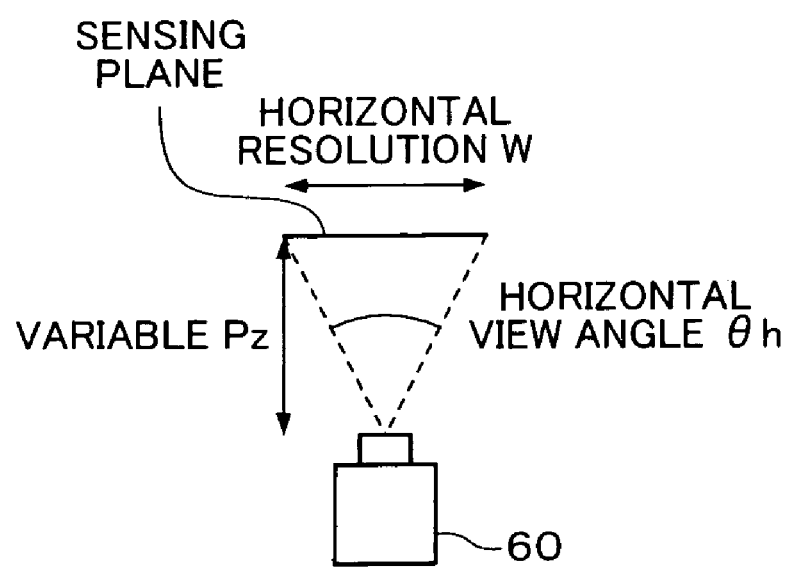
FIG. 9 is a schematic diagram of a sensing plane of a sensor according to an example of an embodiment of the present invention.

FIG. 9 is a schematic diagram of the sensing plane of the sensor 60 according to an example of the present embodiment.

In the case where the horizontal resolution of the sensor 60 is denoted by W and the horizontal view angle of the sensor 60 is denoted by θh, the variable Pz is expressed as (W/2)/tan (θh/2).

The correction information generation section 120 transforms the three-dimensional coordinates A', B', C', and D' of the screen 10 from the sensor three-dimensional coordinate system (xc, yc, zc) into the projector three-dimensional coordinate system (xp, yp, zp). In more detail, the correction information generation section 120 may transform (xc, yc, zc, 1) into (xp, yp, zp, 1) by using a matrix with four rows and four columns, for example. The parameter in the matrix is determined by the positional relationship and the angular relationship between the sensor 60 and the projector 20.

The correction information generation section 120 calculates the normal vector N(Nx, Ny, Nz) of the screen 10 by using three points among the coordinates a(ax, ay, az) to d(dx, dy, dz) of the four corners of the screen 10 in the projector three-dimensional coordinate system.

In the case of calculating the normal vector by using a, c, and d, Nx=(dy−cy)*(az−dz)−(dz−cz)*(ay−dy), Ny=(dz−cz) *(ax−dx)−(dx−cx)*(az−dz), and Zn=(dx−cx)*(ay−dy)−(dy−cy)*(ax−dx).

Since the angle formed by the normal vector N and the vector (0, 0, 1) (horizontal θx, vertical θy) corresponds to the angle formed by the screen 10 and the optical axis of the projection light of the projector 20, the correction information generation section 120 searches for the coordinates of the four corners of the projection area after correction from a two-dimensional look-up table by using θx and θy.

Figure 10:
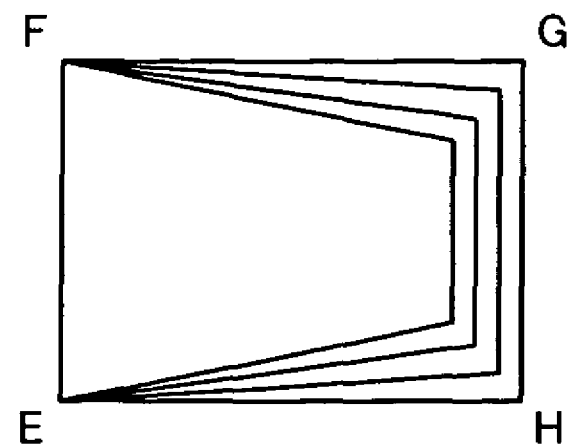
FIG. 10 is a schematic diagram showing coordinates of four corners of a projection area after correction according to an example of an embodiment of the present invention.

FIG. 10 is a schematic diagram showing the coordinates of the four corners of the projection area after correction according to an example of the present embodiment. FIG. 11 is a two-dimensional look-up table showing the coordinates of the four corners of the projection area after correction according to an example of the present embodiment.

As shown in FIG. 11, in the two-dimensional look-up table, the values for θx and θy are associated with the xy coordinates of the coordinates E, F, G, and H of the four corners of the projection area after correction.

The correction information generation section 120 generates the image distortion correction information using the xy coordinates of the coordinates E, F, G, and H utilizing the two-dimensional look-up table shown in FIG. 11, and sends the image distortion correction information to the distortion correction section 130.

This method also enables the projector 20 to correct image distortion based on the coordinates of the four corners of the screen 10.

Second Embodiment

The projector 20 for projecting an image at a given aspect ratio is described below.

For example, even if a part of the projected image 12 is projected outside the screen 10 as shown in FIG. 1, the projector 20 can sense the center region of the projected image inside the screen 10 by dividing the projected image 12 equally into nine regions and using the center region as a reference.

For example, the projector 20 can determine the position of the center region in the sensing region 17 of the sensor 60 by comparing each pixel of an all-black first calibration image with each pixel of a second calibration image in which the center region is white and eight peripheral regions are black.

Figure 12:
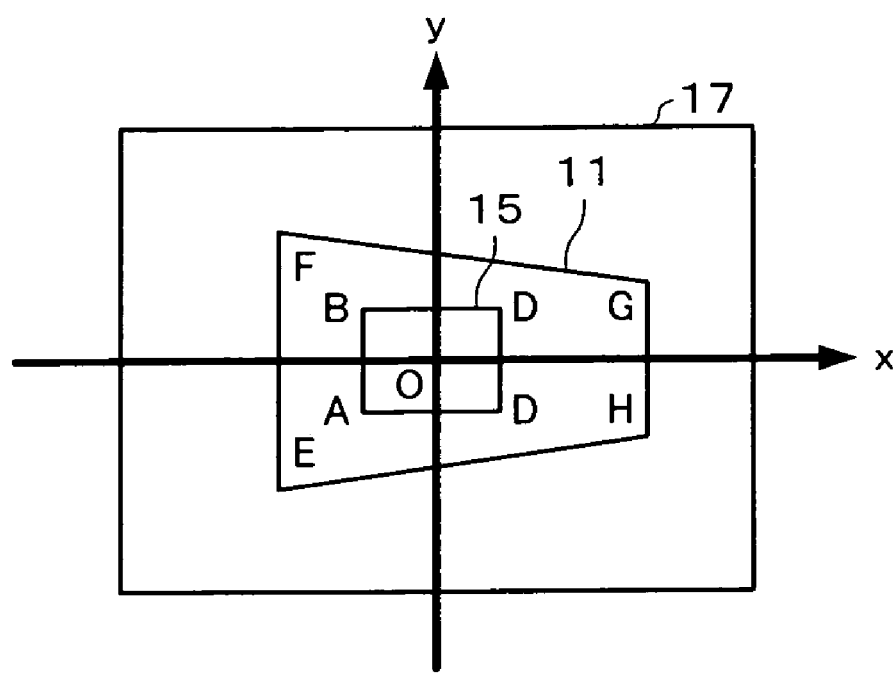
FIG. 12 is a schematic diagram showing a sensing region in an example of an embodiment of the present invention.
Figure 13:
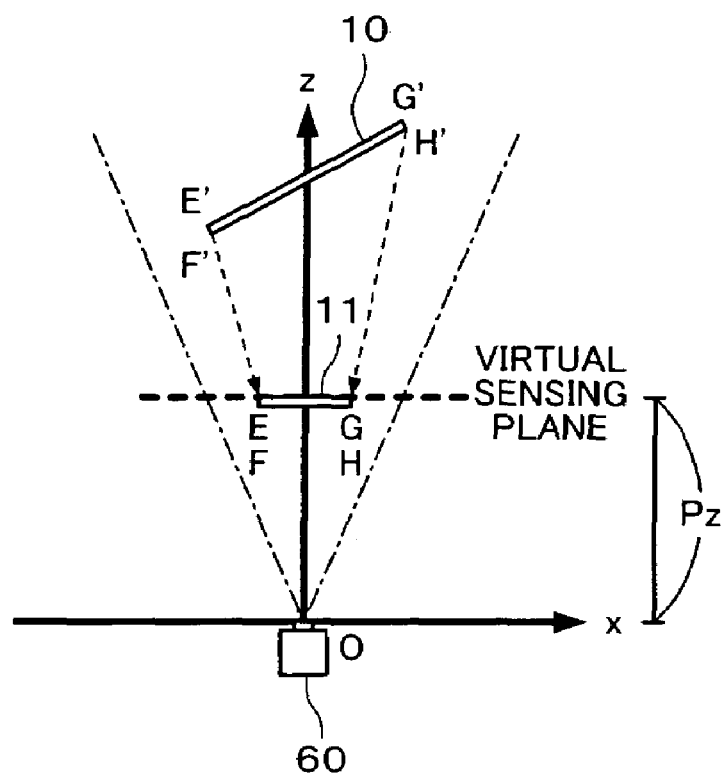
FIG. 13 is a schematic diagram in the case where a screen according to an example of an embodiment of the present invention is perspectively projected by using a sensor as the origin.

FIG. 12 is a schematic diagram showing the sensing region 17 in an example of the present embodiment. FIG. 13 is a schematic diagram in the case where the screen 10 according to an example of the present embodiment is perspectively projected with respect to the sensor 60 as the origin.

In this case, the sensor 60 can sense the center region 15 inside the projection target region 11 in the sensing region 17.

A sensor coordinate system having the center of the sensing region 17 of the sensor 60 as the origin is considered below as an example. In the sensor coordinate system, the horizontal direction of the sensing region 17 is the x-axis, the vertical direction of the sensing region 17 is the y-axis, and the normal direction of the sensing region 17 is the z-axis.

The projection target region information generation section 140 generates the projection target region information which indicates the coordinates of the projection target region 11 in the sensor coordinate system. The projection area information generation section 150 generates the projection area information which indicates the coordinates of the projection area in the sensor coordinate system.

The coordinates of the four corners of the projection target region 11 in the sensing region 17 are denoted by E (Ex, Ey), F (Fx, Fy), G (Gx, Gy), and H (Hx, Hy). These two-dimensional coordinates correspond to the coordinates obtained by perspectively projecting four vertices E', F', G', and H' of the screen 10 which exists in the three-dimensional space onto a virtual sensing plane z=Pz which exists in the normal direction of the origin O of the sensor 60. The origin O is the center point of the sensing region 17.

Therefore, the sensor three-dimensional coordinates of the four vertices of the screen 10 perspectively projected onto the virtual sensing plane are expressed as E(Ex, Ey, Pz), F(Fx, Fy, Pz), G(Gx, Gy, Pz), and H(Hx, Hy, Pz) which have the same z-axis component. The projection target region information generation section 140 can determine Pz by calculating Pz=(VR/2)/tan(θc/2) based on the relationship between the horizontal view angle θc and the horizontal resolution VR of the sensor 60.

Since the four vertices of the actual screen 10 exist ahead of the vertices E, F, G, and H from the origin of the sensor 60, the four vertices of the screen 10 are expressed as s*E(Ex, Ey, Pz), t*F(Fx, Fy, Pz), u*G(Gx, Gy, Pz), and v*H(Hx, Hy, Pz). Note that s, t, u, and v are real numbers.

Since the screen 10 is rectangular, the side E'F' and the side G'H' are in parallel and equal in length and the side E'H' and the side F'G' are in parallel and equal in length. The projection target region information generation section 140 can determine the coordinates of the four vertices of the screen 10 in the three-dimensional coordinate system of the sensor 60 by solving s, t, u, and v based on the above condition, and the correction information generation section 120 can determine the aspect ratio of the screen 10 based on the determined coordinates.

From the above presupposition, E'F'=(t*Fx−s*Ex, t*Fy−s*Ey, t*Pz−s*Pz) and H'G'=(u*Gx−v*Hx, u*Gy−v*Hy, u*Pz−v*Pz).

And t*Fx−s*Ex equals u*Gx−v*Hx, t*Fy−s*Ey equals u*Gy−v*Hy, and t*Pz−s*Pz equals u*Pz−v*Pz. Therefore, t*Fx−u*Gx+v*Hx=s*Ex . . . (1), t*Fy−u*Gy+v*Hy=s*Ey . . . (2), and t*Pz+u*Pz+v*Pz=s*Pz . . . (3) are obtained.

Dividing the equation (3) by Pz yields t−u+v=s . . . (4).

Substituting the value obtained by multiplying the equation (4) by Hx into the equation (1) yields (Fx−Hx)*t+(Hx−Gx)*u=(Ex−Hx)*s . . . (5).

Substituting the value obtained by multiplying the equation (4) by Hx into the equation (2) yields (Fy−Hy)*t+(Hy−Gy)*u=(Ey−Hy)*s . . . (6).

In the equations (5) and (6), suppose that a=(Fx−Hx), b=(Hx−Gx), c=(Ex−Hx), d=(Fy−Hy), e=(Hy−Gy), and f=(Ey−Hy). In this case, the equation (5) is expressed as a*t+b*u=c*s, and the equation (6) is expressed as d*t+e*u=f*s.

Solving these equations yields t=s*(e*c−b*f)/(e*a−b*d) and u=s*(d*c−a*f)/(d*b−a*e). Specifically, t and u can be expressed by using s. The position of the screen 10 in the case of changing the variable s which shows the depth information is described below.

Figure 14:
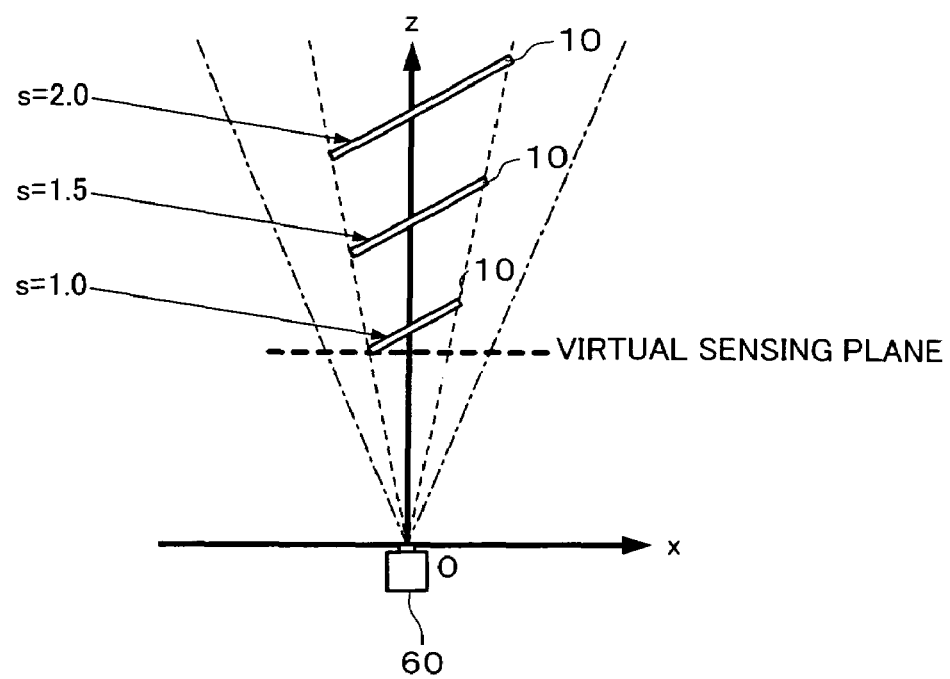
FIG. 14 is a schematic diagram in the case of changing a variable s in an example of an embodiment of the present invention.

FIG. 14 is a schematic diagram in the case of changing the variable s in an example of the present embodiment.

As shown in FIG. 14, since the shape of the screen 10 is similar even if the variable s is changed, the aspect ratio is invariable. Therefore, the aspect ratio can be calculated by assuming that s=1. If s=1, t=(e*c−b*f)/(e*a−b*d), u=(d*c−a*f)/(d*b−a*e), and v=1−t*u.

The correction information generation section 120 calculates the aspect ratio by using the three-dimensional coordinates of the four vertices of the screen 10 based on the projection target region information from the projection target region information generation section 140. The aspect ratio used herein refers to the ratio of the length of the horizontal side of the target region to the length of the vertical side of the target region. In the case where horizontal length: vertical length=4:3, the aspect ratio is ¾=0.75. In the present embodiment, the projected image 12 is corrected so that the aspect ratio of the projected image 12 is 0.75.

Figure 15A:
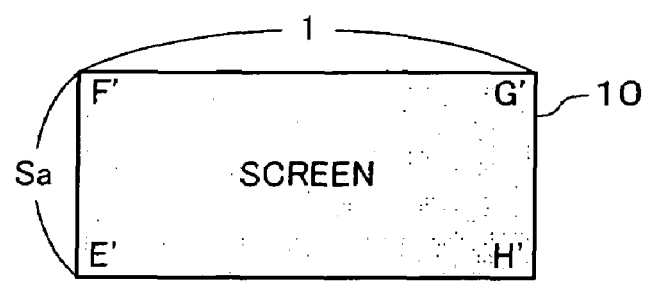
FIG. 15A shows a screen in which the width is greater than the height.
Figure 15B:
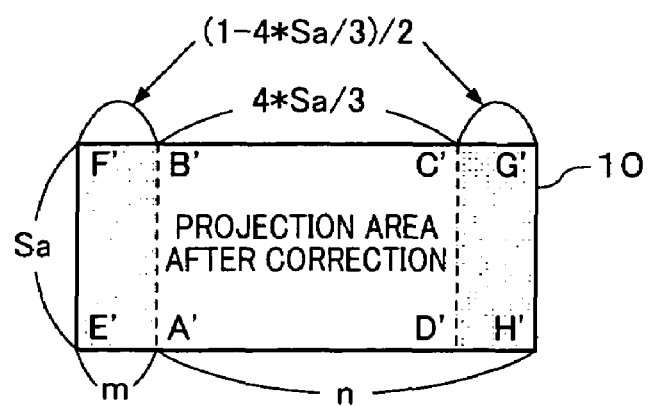
FIG. 15B is view showing a projection area after correction on the screen shown in FIG. 15A.
Figure 16A:
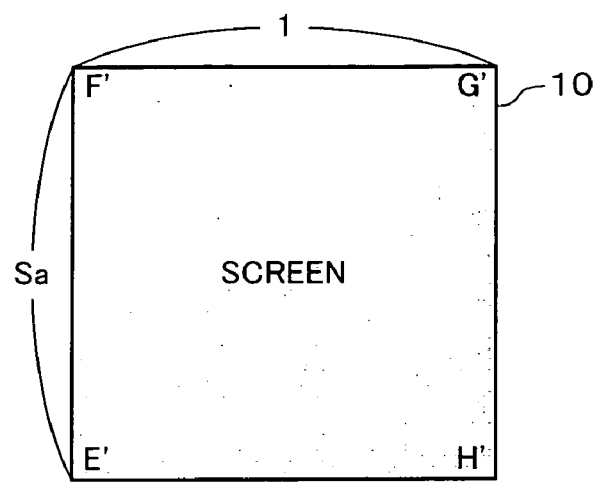
FIG. 16A shows a screen in which the height is greater than the width.
Figure 16B:
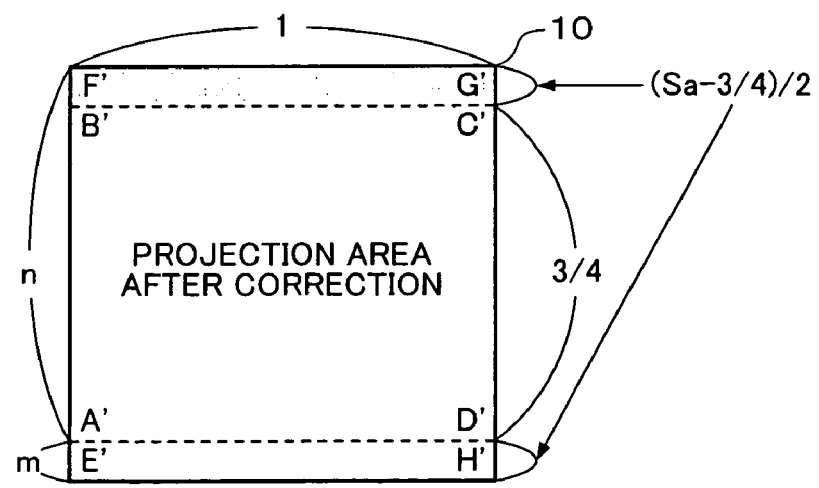
FIG. 16B is view showing a projection area after correction on the screen shown in FIG. 16A.

FIG. 15A shows the screen 10 in which the width is greater than the height. FIG. 15B shows the projection area after correction on the screen 10 shown in FIG. 15A. FIG. 16A shows the screen 10 in which the width is smaller than the height. FIG. 16B shows the projection area after correction on the screen 10 shown in FIG. 16A.

In the case where the aspect ratio of the screen 10 is approximately equal to 0.75 (aspect ratio may not necessarily be equal to 0.75 insofar as it is in the allowable range), the correction information generation section 120 generates the correction information so that the shape of the projected image 12 corresponds to the shape of the screen 10. In the present embodiment, the correction information generation section 120 generates the correction information so that the shape of the projected image 12 corresponds to the shape of the screen 10 when the aspect ratio is 0.75 for convenience of description.

As shown in FIG. 15A, in the case where the aspect ratio is smaller than 0.75, specifically, the width of the screen 10 is greater than its height, the correction information generation section 120 generates the correction information so that the projection area A'B'C'D' after correction is formed in the region smaller than the screen 10 on the right and left as shown in FIG. 15B.

In the case where the aspect ratio Sa is smaller than 0.75, since A' is the point which divides E'H' at a ratio of m:n, A'=(n*E'+m*H')/(m+n). Note that m+n=1.

Since height:width of the screen 10=sa:1, it is necessary that m=(1−4*Sa/3)/2 and n=1−(1−4*Sa/3)/2 in order to maintain the aspect ratio of the projection area after correction at 0.75. The projection area information generation section 150 calculates B', C', and D' in the same manner as A'.

As shown in FIG. 16A, in the case where the aspect ratio is greater than 0.75, specifically, the height of the screen 10 is greater than the width, the correction information generation section 120 generates the correction information so that the projection area A'B'C'D' after correction is formed in the region smaller than the screen 10 at the top and bottom as shown in FIG. 16B.

In the case where the aspect ratio Sa is greater than 0.75, since A' is the point which divides E'F' at a ratio of m:n, A'=(n*E'+m*F')/(m+n). Note that m+n=1.

Since height:width of the screen 10=sa:1, it is necessary that m=(Sa−3/4)/2 and n=Sa−(Sa−3/4)/2 in order to maintain the aspect ratio of the projection area after correction at 0.75. The projection area information generation section 150 calculates B', C', and D' in the same manner as A'.

The projection area information generation section 150 generates the projection area information which indicates the coordinates A', B', C', and D' of the projection area after correction in this manner.

The correction information generation section 120 may generate the correction information so that the projection area after correction is increased to some extent based on the projection area information from the projection area information generation section 150. This enables image appearance to be improved as a frameless image. If the magnification factor is denoted by Ps and the intersecting point of the diagonal lines of the projection area after correction is denoted by P, the correction information generation section 120 calculates the vertex A' of the projection area after magnification as shown by A'=Ps*PA'+OP. The correction information generation section 120 calculates B', C', and D' in the same manner as A'.

A', B', C', and D' in the sensor coordinate system determined as described above are perspectively projected onto the screen 10. This transformation processing is performed by setting the depth information z at Pz.

For example, the correction information generation section 120 calculates the coordinates of the vertex A' as A'x=A'x/A'z*Pz, A'y=A'y/A'z*Pz, and A'z=A'z/A'z*Pz. The correction information generation section 120 calculates B', C', and D' in the same manner as A'.

Figure 17:
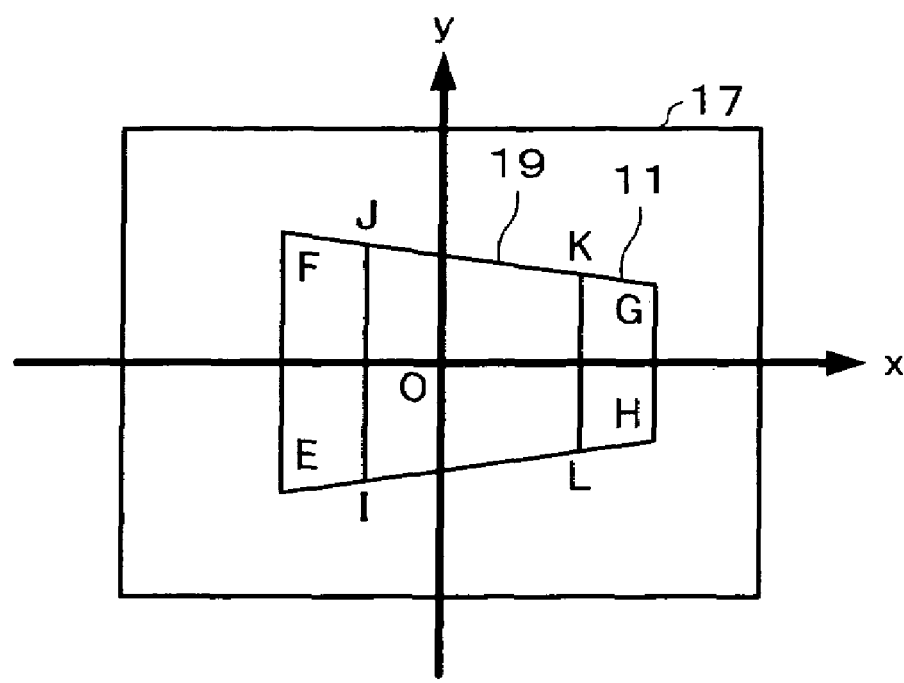
FIG. 17 is a schematic diagram showing a projection area after correction in a sensing region in an example of an embodiment of the present invention.
Figure 18:
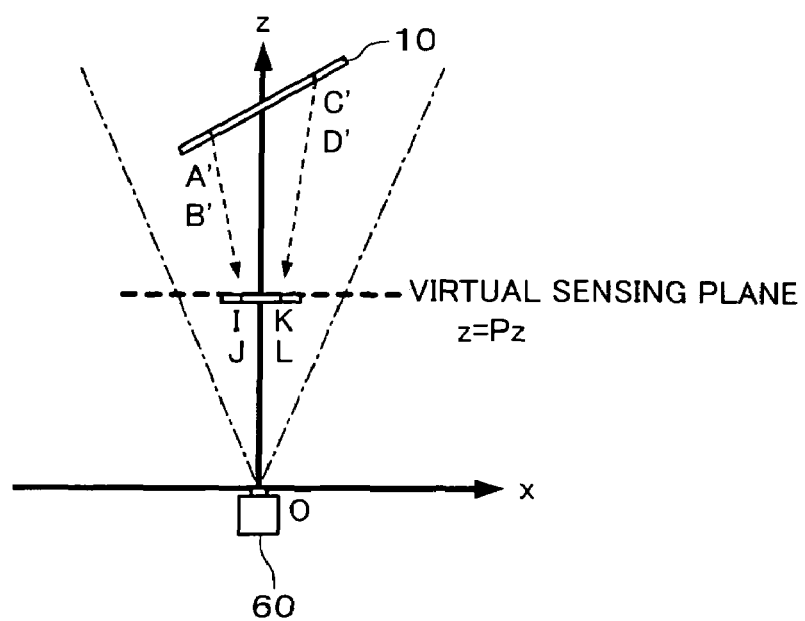
FIG. 18 is a schematic diagram in the case where a projection area after correction according to an example of an embodiment of the present invention is perspectively projected with respect to a sensor as the origin.

FIG. 17 is a schematic diagram showing the projection area 19 after correction in the sensing region 17 in an example of the present embodiment. FIG. 18 is a schematic diagram in the case where the projection area after correction according to an example of the present embodiment is perspectively projected with respect to the sensor 60 as the origin.

The correction information generation section 120 transforms the coordinates of the projection area after correction on the screen 10 into the coordinates in a liquid crystal panel 920.

The correction information generation section 120 generates a coordinate transformation parameter based on the correspondence relationship between the known coordinates A(Ax, Ay), B(Bx, By), C(Cx, Cy), and D(Dx, Dy) of the four vortices of the center region in the sensor coordinate system and the coordinates I(Ix, Iy), J(Jx, Jy), K(Kx, Ky), and L(Lx, Ly) of the four vortices of the center region in the liquid crystal panel 920.

FIG. 19 shows an arithmetic expression for determining the coordinate transformation parameter according to an example of the present embodiment.

The correction information generation section 120 transforms the coordinates of the projection area A'B'C'D' after correction into the coordinates in the liquid crystal panel 920 by using coordinate transformation parameters Pa to Ph shown in FIG. 19.

In the case of the vertex A', A'x=(Pa*A'x+Pb*A'y+Pc)/(Pg*A'x+Ph*A'y+1) and A'y=(Pd*A'x+Pe*A'y+Pf)/(Pg*A'x+Ph*A'y+1). This also applies to the vertices B', C', and D'.

The correction information generation section 120 generates the correction information based on the difference between the original coordinates in the liquid crystal panel 920 and the coordinates in the liquid crystal panel 920 after correction. The distortion correction section 130 corrects the image signal based on the generated correction information. The image projection section 190 projects an image based on the corrected image signal.

This enables the projector 20 to project an image without distortion at the center of the screen 10 by effectively utilizing the screen 10 as much as possible.

As described above, according to the present embodiment, the projector 20 can project an image at a desired aspect ratio by effectively utilizing the region of the screen 10. This enables the projector 20 to project an image which is easily seen by an observer without being affected by the shape of the screen 10.

Moreover, the projector 20 can appropriately correct an image without being affected by the difference in position between the projector 20 and the sensor 60 by calculating the coordinates using the sensor coordinate system. Therefore, various types of sensing means such as a sensor included in the projector 20, a sensor positioned at a distance from the projector 20, or a digital camera can be employed as the sensor 60.

Modification

The present invention is not limited to the above-described embodiments. Various modifications and variations can be made.

The present invention is particularly effective in the case where the projected image 12 includes the screen 10. For example, the projector 20 may automatically detect the inclusion relationship between the projected image 12 and the screen 10, and determine the image correction method to be applied corresponding to the detection result.

In the case where the projector 20 has a zoom function, the projector 20 may project an image by performing zoom adjustment so that the projected image 12 includes the screen 10, for example.

In the above-described embodiments, the projected image 12 is divided equally into nine regions and the center region is used as the reference. However, the size and position of the center region may be arbitrary insofar as the projector 20 can include the center region of the projected image inside the screen 10.

In the above-described embodiments, the screen 10 is used as the projection target. However, the projection target may be a white board, wall, or the like insofar as the projection target is in the shape of a quadrilateral which allows detection of the four corners.

In the above-described embodiments, the projector 20 is used as the image processing system. However, the present invention is also effective for an image processing system for a display such as a cathode ray tube (CRT), light emitting diode (LED), or electroluminescence (EL) in addition to the projector 20.

As the projector 20, a liquid crystal projector, a projector using a digital micromirror device (DMD), or the like may be used. DMD is a trademark of Texas Instruments, Inc. (U.S.A.).

The function of the projector 20 may be implemented by only a projector, or may be distributed in a plurality of processing devices (distributed processing of projector and PC, for example).

What is claimed is:

1. An image processing system comprising:
    an image projection means for projecting a single-color calibration image formed of an arbitrary single color onto a projection target when a calibration is performed, and projecting a multi-color calibration image onto the projection target when the calibration is performed, the multi-color calibration image including a first region and a second region, the first region being in a first single color and smaller than an entire image region and the second region being a region other than the first region and in a second single color, which is a color other than the first single color;
    a sensing means for sensing the single-color calibration image projected onto the projection target to generate first sensing information, and sensing the multi-color calibration image projected onto the projection target to generate second sensing information;
    a projection target region information generation means for generating projection target region information which indicates coordinates of four corners of the projection target in a sensing region of the sensing means based on a difference in image signal value between each pixel of a sensed image based on the first sensing information;
    a projection area information generation means for detecting the first region in the sensing region as a partial projection area based on a difference between the first sensing information and the second sensing information, and generating projection area information which indicates coordinates of four corners of a projection area in the sensing region based on the partial projection area;
    a correction information generation means for generating image distortion correction information based on the projection target region information and the projection area information; and
    a distortion correction means for correcting an image signal so that image distortion is corrected based on the image distortion correction information.

2. The image processing system as defined in claim 1, wherein the correction information generation means:
    calculates a relative distance between an origin in a three-dimensional space in which an optical axis of the sensing means is added to a two-dimensional plane of the sensing region as a third dimension and the four corners of the projection target on the optical axis based on the projection target region information;
    calculates coordinates of the four corners of the projection target in the three-dimensional space based on the projection target region information and the relative distance;
    calculates a first height/width ratio which indicates a height/width ratio of the projection target by calculating lengths of two sides of the projection target which are not opposite each other based on the coordinates;
    calculates coordinates of four corners of an image in the sensing region in a case where the image projection means projects the image onto the projection target in an undistorted state at a second height/width ratio based on the first height/width ratio, the second height/width ratio and the projection target region information, the second height/width ratio indicating a height/width ratio of the single-color calibration image, the multi-color calibration image, or a projection panel of the image projection means; and
    generates the image distortion correction information based on the coordinates of the four corners of the image in the sensing region and the projection area information.

3. The image processing system as defined in claim 1, wherein the correction information generation means determines a first height/width ratio which indicates a height/width ratio of the projection target based on the projection target region information, and generates projection coordinate system projection area information which indicates coordinates of four corners of the projection area in a projection panel of the image projection means based on the projection area information and generates the image distortion correction information based on the projection coordinate system projection area information so that an image is displayed at a second height/width ratio which indicates a desired height/width ratio corresponding to the first height/width ratio.

4. The image processing system as defined in claim 1, wherein the projection target region information generation means searches for an image signal value of the sensing information so that each pixel is radially searched for from a region near a center of the sensing region, and generates the projection target region information by determining the projection target region based on a difference in the image signal value during searching.

5. The image processing system as defined in claim 1, wherein the first region is reduced in size while maintaining the shape of the entire image,
    wherein the size of the first region and the entire image is in the ratio of 1 :n, n being a number greater than 1, and
    wherein the projection area information generation means detects a region formed by multiplying the partial projection area by n as the projection area.

6. An image processing system comprising:
    an image projection section which projects a single-color calibration image formed of an arbitrary single color onto a projection target when a calibration is performed, and projects a multi-color calibration image onto the projection target when the calibration is performed, the multi-color calibration image including a first region and a second region, the first region being in a first single color and smaller than an entire image region and the second region being a region other than the first region and in a second single color, which is a color other than the first single color;
    a sensing section which senses the single-color calibration image projected onto the projection target to generate first sensing information, and senses the multi-color calibration image projected onto the projection target to generate second sensing information;
    a projection target region information generation section which generates projection target region information which indicates coordinates of four corners of the projection target in a sensing region of the sensing section based on a difference in image signal value between each pixel of a sensed image based on the first sensing information;
a projection area information generation section configured to detect the first region in the sensing region as a partial projection area based on a difference between the first sensing information and the second sensing information, and generates projection area information which indicates coordinates of four corners of a projection area in the sensing region based on the partial projection area;
a correction information generation section which generates image distortion correction information based on the projection target region information and the projection area information; and
a distortion correction section which corrects an image signal so that image distortion is corrected based on the image distortion correction information,
wherein the image projection section projects an image based on the image signal corrected by the distortion correction section.

7. A projector comprising:
an image projection means for projecting a single-color calibration image formed of an arbitrary single color onto a projection target when a calibration is performed, and projecting a multi-color calibration image onto the projection target when the calibration is performed, the multi-color calibration image including a first region and a second region, the first region being in a first single color and smaller than an entire image region and the second region being a region other than the first region and in a second single color, which is a color other than the first single color;
a sensing means for sensing the single-color calibration image projected onto the projection target to generate first sensing information, and sensing the multi-color calibration image projected onto the projection target to generate second sensing information;
a projection target region information generation means for generating projection target region information which indicates coordinates of four corners of the projection target in a sensing region of the sensing means based on a difference in image signal value between each pixel of a sensed image based on the first sensing information;
a projection area information generation means for detecting the first region in the sensing region as a partial projection area based on a difference between the first sensing information and the second sensing information, and generating projection area information which indicates coordinates of four corners of a projection area in the sensing region based on the partial projection area;
a correction information generation means for generating image distortion correction information based on the projection target region information and the projection area information; and
a distortion correction means for correcting an image signal so that image distortion is corrected based on the image distortion correction information.

8. A projector comprising:
an image projection section which projects a single-color calibration image formed of an arbitrary single color onto a projection target, and projects a multi-color calibration image onto the projection target, the multi-color calibration image including a first region and a second region, the first region being in a first single color and smaller than an entire image region and the second region being a region other than the first region and in a second single color, which is a color other than the first single color;
a sensing section which senses the single-color calibration image projected onto the projection target to generate first sensing information, and senses the multi-color calibration image projected onto the projection target to generate second sensing information;
a projection target region information generation section which generates projection target region information which indicates coordinates of four corners of the projection target in a sensing region of the sensing section based on a difference in image signal value between each pixel based on the first sensing information;
a projection area information generation section configured to detect the first region in the sensing region as a partial projection area based on a difference between the first sensing information and the second sensing information, and generates projection area information which indicates coordinates of four corners of a projection area in the sensing region based on the partial projection area;
a correction information generation section which generates image distortion correction information based on the projection target region information and the projection area information; and
a distortion correction section which corrects an image signal so that image distortion is corrected based on the image distortion correction information.

9. An image processing method comprising:
projecting a single-color calibration image formed of an arbitrary single color onto a projection target by an image projection section when a calibration is performed;
sensing the single-color calibration image projected onto the projection target by a sensing section to generate first sensing information;
projecting a multi-color calibration image onto the projection target when the calibration is performed, the multi-color calibration image including a first region and a second region, the first region being in a first single color and smaller than an entire image region and the second region being a region other than the first region and in a second single color, which is a color other than the first single color;
sensing the multi-color calibration image projected onto the projection target to generate second sensing information;
generating projection target region information which indicates coordinates of four corners of the projection target in a sensing region of the sensing section based on a difference in image signal value between each pixel of a sensed image based on the first sensing information;
detecting the first region in the sensing region as a partial projection area based on a difference between the first sensing information and the second sensing information, and generating projection area information which indicates coordinates of four corners of a projection area in the sensing region based on the partial projection area;
generating image distortion correction information based on the projection target region information and the projection area information;
correcting an image signal so that image distortion is corrected based on the image distortion correction information; and
projecting an image based on the image signal.

10. The image processing method as defined in claim 9,
wherein the first region is reduced in size while maintaining shape of the entire image,
wherein the size of the first region and the entire image is in the ratio of 1:n, and a region formed by multiplying the partial projection area by n is detected as the projection area, and
wherein n is a real number greater than zero.

11. The image processing method as defined in claim 9, the method comprising:
calculating a relative distance between an origin in a three-dimensional space in which an optical axis of the sensing section is added to a two-dimensional plane of the sensing region as a third dimension and the four corners of the projection target on the optical axis based on the projection target region information;
calculating coordinates of the four corners of the projection target in the three-dimensional space based on the projection target region information and the relative distance;
calculating a first height/width ratio which indicates a height/width ratio of the projection target by calculating lengths of two sides of the projection target which are not opposite each other based on the coordinates;
calculating coordinates of four corners of an image in the sensing region in a case of projecting the image onto the projection target in an undistorted state at a second height/width ratio based on the first height/width ratio, the second height/width ratio and the projection target region information, the second height/width ratio indicating a height/width ratio of the single-color calibration image, the multi-color calibration image, or a projection panel of the image projection section; and
generating the image distortion correction information based on the coordinates of the four corners of the image in the sensing region and the projection area information.

12. The image processing method as defined in claim 9, the method comprising:
determining a first height/width ratio which indicates a height/width ratio of the projection target based on the projection target region information;
generating projection coordinate system projection area information which indicates coordinates of four corners of the projection area in a projection panel based on the projection area information so that an image is displayed at a second height/width ratio which indicates a desired height/width ratio corresponding to the first height/width ratio; and
generating the image distortion correction information based on the projection coordinate system projection area information.

13. The image processing method as defined in claim 12, the method comprising:
calculating a relative distance between an origin in a three-dimensional space in which an optical axis of the sensing section is added to a two-dimensional plane of the sensing region as a third dimension and the four corners of the projection target on the optical axis based on the projection target region information;
calculating coordinates of the four corners of the projection target in the three-dimensional space based on the projection target region information and the relative distance; and
calculating a first height/width ratio by calculating lengths of two sides of the projection target which are not opposite each other based on the coordinates.

14. The image processing method as defined in claim 9, the method comprising:
searching for an image signal value of the sensing information so that each pixel is radially searched for from a region near a center of the sensing region, and generating the projection target region information by determining the projection target region based on a difference in the image signal value during searching when generating the projection target region information.

* * * * *